United States Patent [19]

Imai

[11] Patent Number: 4,573,077
[45] Date of Patent: Feb. 25, 1986

[54] SOLID STATE IMAGE SENSING DEVICE WITH PHOTOMETRY FUNCTION

[75] Inventor: Masaharu Imai, Ina, Japan

[73] Assignee: Olympus Optical Co., Ltd., Tokyo, Japan

[21] Appl. No.: 647,170

[22] Filed: Sep. 4, 1984

[30] Foreign Application Priority Data

Sep. 9, 1983 [JP] Japan ............................. 58-165236

[51] Int. Cl.$^4$ .............................................. H04N 3/11
[52] U.S. Cl. .................... 358/212; 250/578; 357/24
[58] Field of Search ............... 358/212, 213; 250/578; 357/24 LR, 22, 30

[56] References Cited

U.S. PATENT DOCUMENTS

| | | | |
|---|---|---|---|
| 4,454,526 | 6/1984 | Nishizawa et al. | 357/30 |
| 4,471,228 | 9/1984 | Nishizawa et al. | 250/578 |
| 4,472,638 | 9/1984 | Nishizawa et al. | 250/578 |
| 4,518,863 | 5/1985 | Fukuoka et al. | 250/578 |

Primary Examiner—Gene Z. Rubinson
Assistant Examiner—Robert G. Lev
Attorney, Agent, or Firm—Parkhurst & Oliff

[57] ABSTRACT

A solid state image sensing device having an array of pixels each including a static induction transistor and a capacitance connected to a gate thereof, a signal read-out line connected to sources of the static induction transistors, a first scanning circuit for reading image signals out of the pixels successively in a destructive manner, a second scanning circuit for reading photometry signals out of preselected pixels in a non-destructive manner, an integrating circuit for integrating the photometry signals, a comparison circuit for comparing an integrated value with a predetermined value to produce a detection signal when the integrated value becomes equal to the predetermined value and a control circuit for controlling the first and second scanning circuits in accordance with the detection signal. When the detection signal is produced, the second scanning circuit is stopped and at the same time the first scanning circuit is initiated to readout all the pixels in a destructive manner.

7 Claims, 32 Drawing Figures

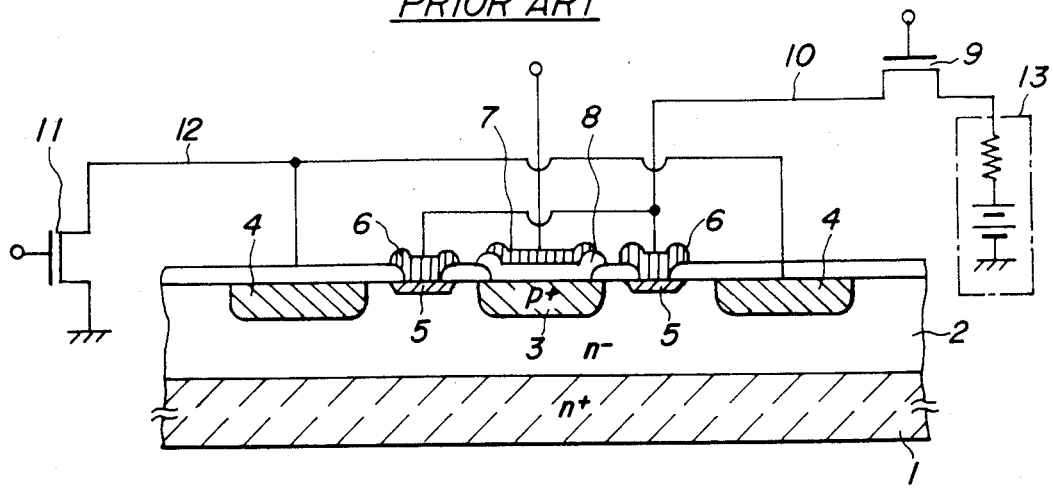
FIG.1 PRIOR ART
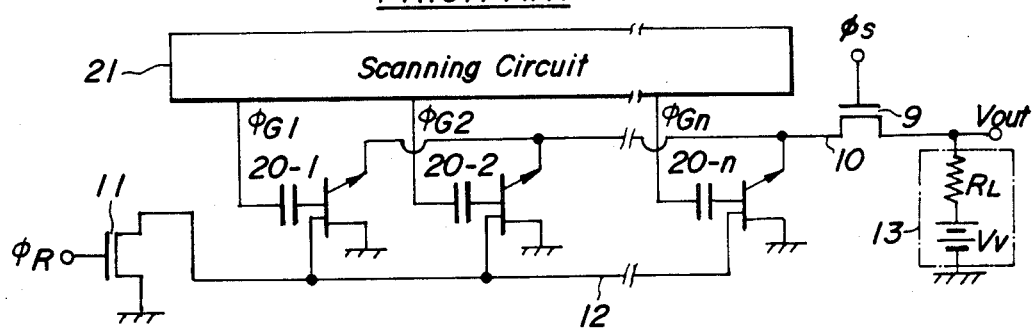
FIG.2 PRIOR ART
FIG.3A PRIOR ART $\phi_{G1}$
FIG.3B PRIOR ART $\phi_{G2}$
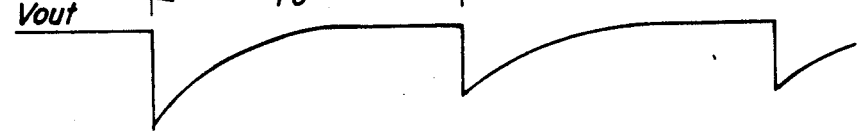
FIG.3C PRIOR ART Vout

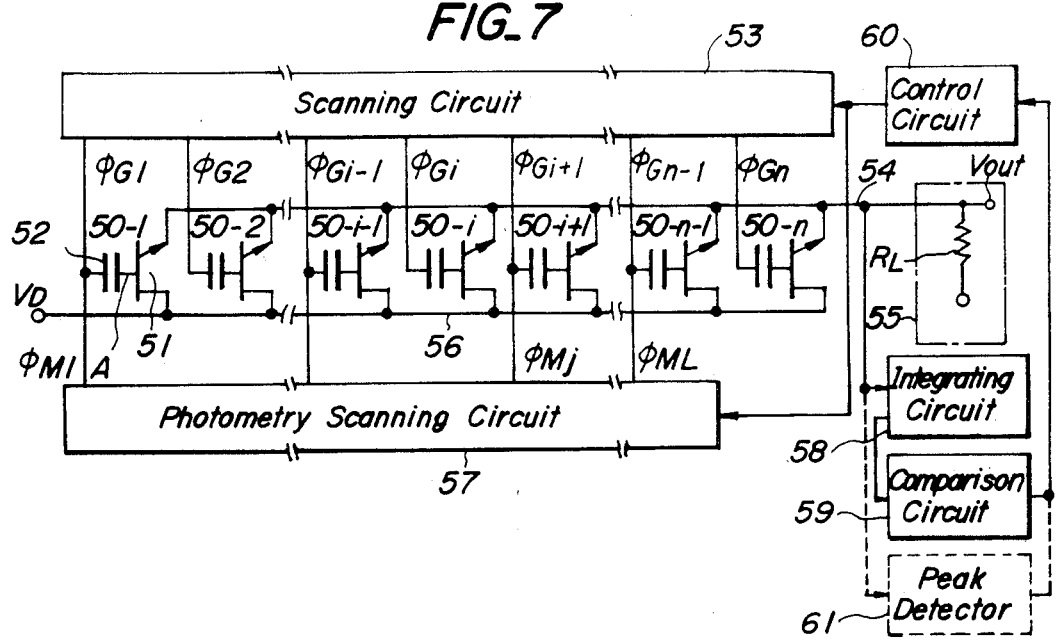
FIG_7

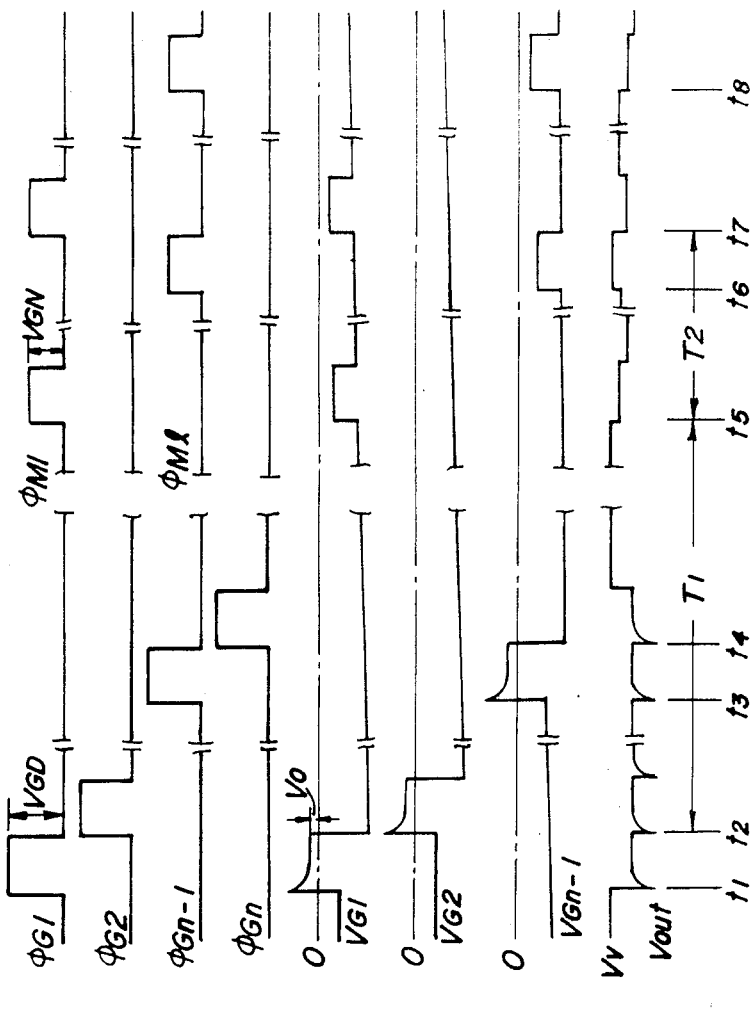

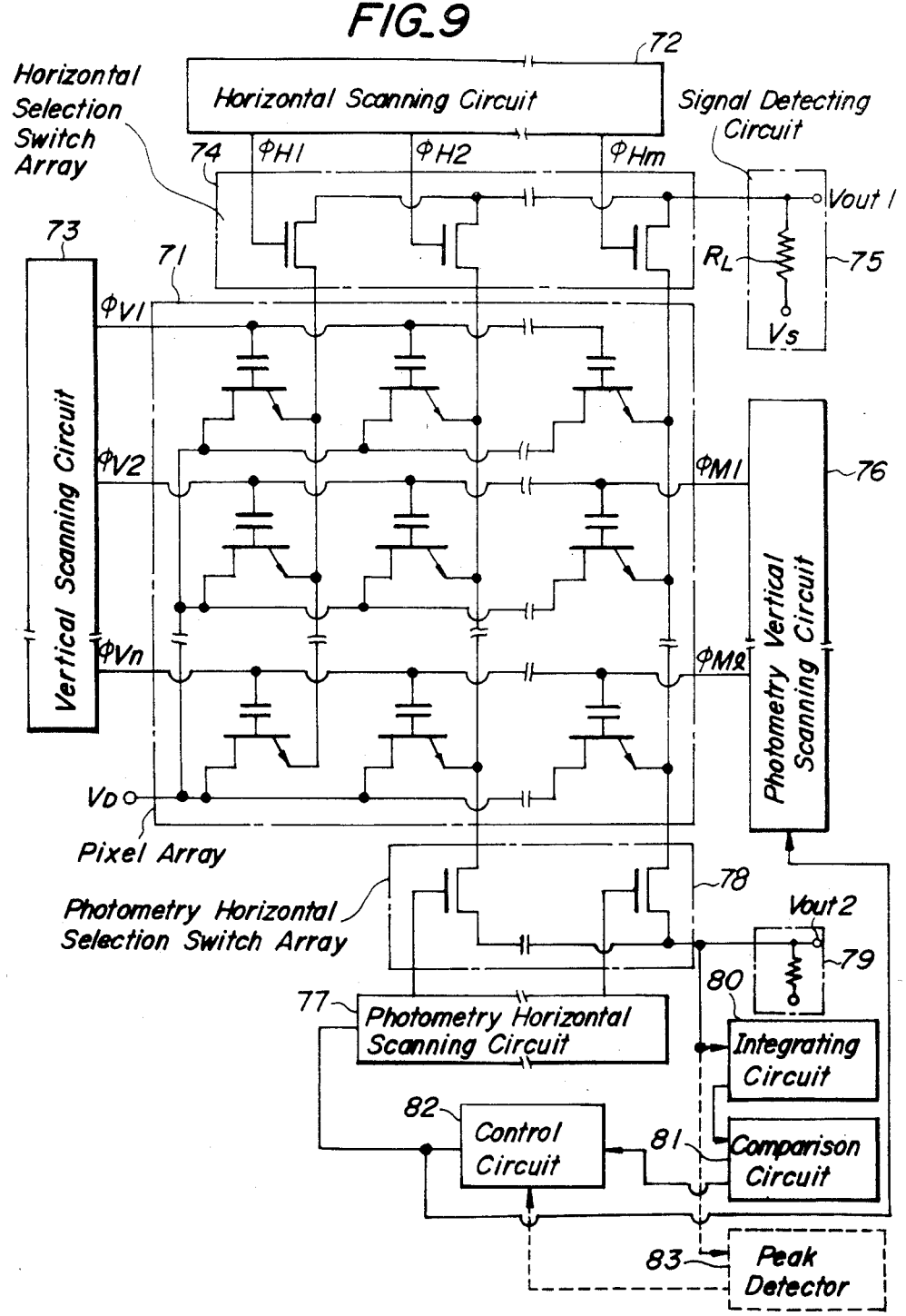

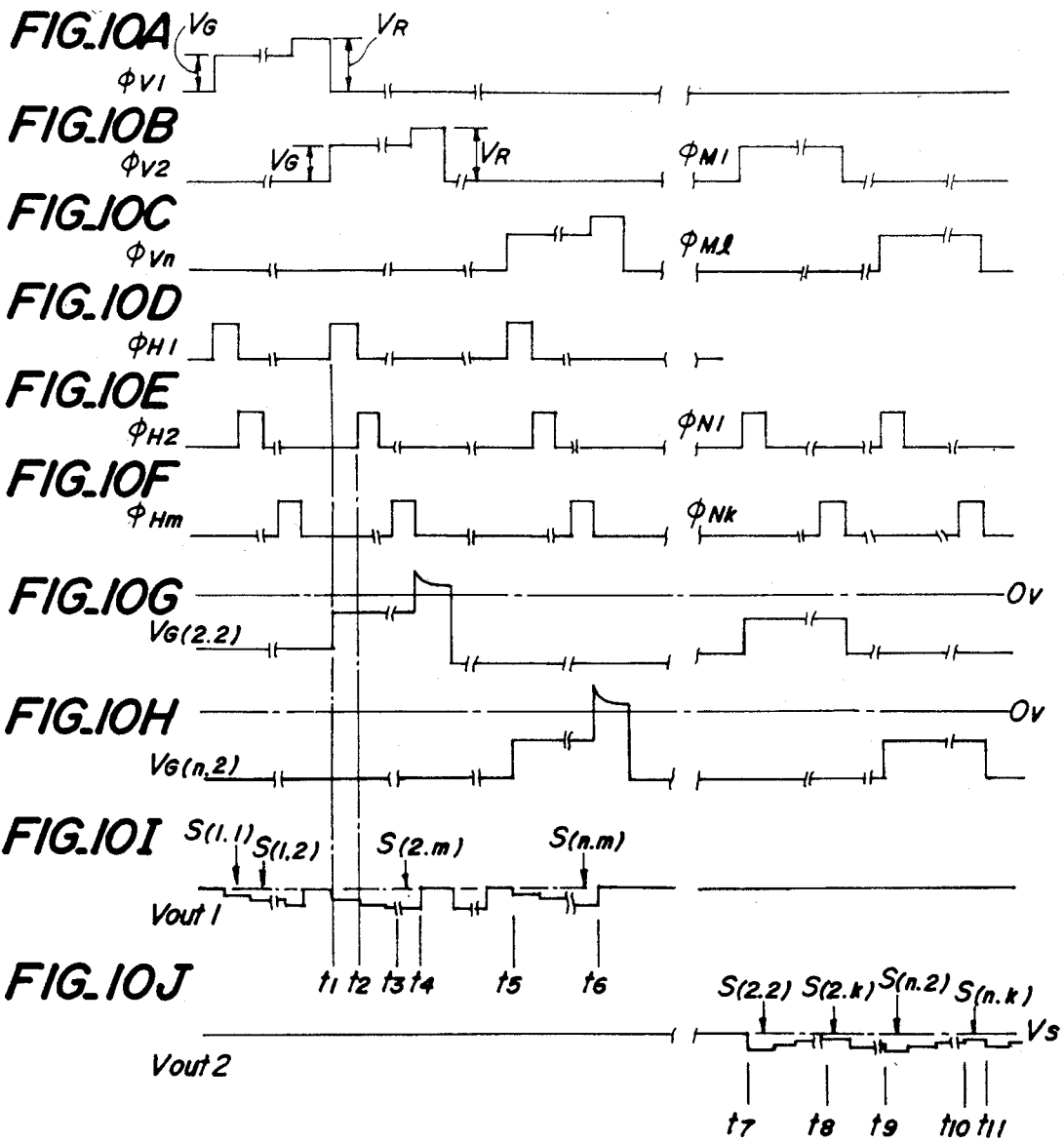

SOLID STATE IMAGE SENSING DEVICE WITH PHOTOMETRY FUNCTION

BACKGROUND OF THE INVENTION

The present invention relates to a solid state image sensing device comprising a plurality of static induction transistors each constituting a pixel Heretofore, there has been proposed, for instance Japanese Patent Application Laid-open Publication No. 105,672/83, a solid state image sensing device comprising pixels, each being formed by a static induction transistor (hereinafter abbreviated as SIT), serving as a photodetecting and switching element. Further, a linear or one dimensional solid state image sensing device comprising SITs has been proposed.

FIG. 1 is a cross section showing a single pixel of a known linear image sensing device comprising SITs serving as the photodetecting and switching elements. An SIT comprises an n+ substrate 1 constituting a drain, an n− epitaxial layer 2 serving as a channel region, a p+ gate diffusion region 3, a p+ shield gate diffusion region 4, an n+ source diffusion region 5, a source electrode 6 formed on the region 5, and a gate electrode 7 formed on the gate region 3 via a gate insulating film 8. Between the gate region 3 and gate electrode 7 is formed a capacitance. The source electrode 6 is connected to a signal readout line 10 in which a refresh selection switch 9 is connected. The shield gate region 4 is connected to a refresh transistor 11 via a reset line 12. The refresh selection switch 9 is further connected to a signal detecting section 13.

FIG. 2 is a circuit diagram illustrating a known one dimensional solid state imaging sensing device comprising the pixels shown in FIG. 1. The device comprises a plurality of SITs 20-1, 20-2 . . . 20-n arranged linearly, gates of SITs being connected to a scanning circuit 21 and sources of SITs being commonly connected to the signal readout line 10 which is connected via the refresh selection switch 9 to the signal detecting section 13 having a load resistor $R_L$ and a voltage supply source $V_V$. The shield gates of the SITs 20-1, 20-2 . . . 20-n are commonly connected to the reset line 12 which is connected to the ground via the refresh transistor 11. The drains of the SITs are commonly connected to the ground.

FIGS. 3A to 3C are waveforms for explaining the operation of the known solid state image sensing device shown in FIG. 2. When the scanning circuit 21 applies signals $\phi_{G1}$, $\phi_{G2}$... successively to the gates of successive SITs 20-1, 20-2 . . . as illustrated in FIGS. 3A and 3B, an output signal $V_{out}$ at the signal detecting section 13 changes as depicted in FIG. 3C. As can be understood from the waveform, during the readout period $T_O$ the gate potential of SIT is refreshed to a potential which is substantially equal to a built-in voltage $\phi_B$ of a pn junction between the p+ gate region 3 and the n− epitaxial layer 2, said potential being near zero volt. Therefore, in the known solid state image sensing device shown in FIG. 2, the refresh selection switch 9 is in fact unnecessary and further the refresh transistor 11 is used not to provide the refresh function, but to control overflow of the gate potential of SIT serving as the photodetecting element.

As explained above, in the known solid state image sensing device, since the SIT is refreshed by the driving signals $\phi_{G1}$, $\phi_{G2}$ . . . , it is impossible to effect a non-destructive readout of the light charge stored in the SIT. Therefore, in the known device it is impossible to effect a photometry for an light image during the image pick-up.

SUMMARY OF THE INVENTION

The present invention has for its object to provide a solid state image device which can perform effectively a photometry for an input image during the pick-up operation by providing a photometry signal readout means for reading out pixel signals in a non-destructive manner in addition to a signal readout means for resetting light charge stored in the SIT.

According to the invention, a solid state image sensing device comprises:

a plurality of pixels each including a static induction transistor having a gate, a drain and a source and a capacitance coupled with the gate of the static induction transistor;

first readout means for reading image signals out of said pixels successively and resetting photocharge stored in the pixels due to light input;

second readout means for reading photometry signals out of selected pixels in a non-destructive manner;

means for processing said photometry signals to produce a detection signal indicating that desired photocharge has been stored in the pixels; and means for controlling said first and second readout means in accordance with said detection signal in such a manner that a photometry is effected while the light input is picked up.

BRIEF DESCRIPTION OF THE DRAWINGS

FIG. 1 is a cross sectional view showing a pixel construction of a known solid state image sensing device;

FIG. 2 is a circuit diagram illustrating the entire construction of the known solid state image sensing device;

FIGS. 3A to 3C are waveforms for explaining the operation of the known solid state image sensing device;

FIG. 7 is a circuit diagram showing an embodiment of the solid state image sensing device according to the invention;

FIGS. 8A to 8H are waveforms for explaining the operation of the device shown in FIG. 7;

FIG. 9 is a circuit diagram illustrating another embodiment of the solid state image sensing device according to the invention; and FIGS. 10A to 10J are waveforms for explaining the operation of the device depicted in FIG. 9.

DESCRIPTION OF THE PREFERRED EMBODIMENTS

Before explaining embodiments of the solid state image sensing device according to the invention, there will be first explained a solid state image sensing device in which a pixel signal can be readout in a non-destructive manner.

Figure 4:
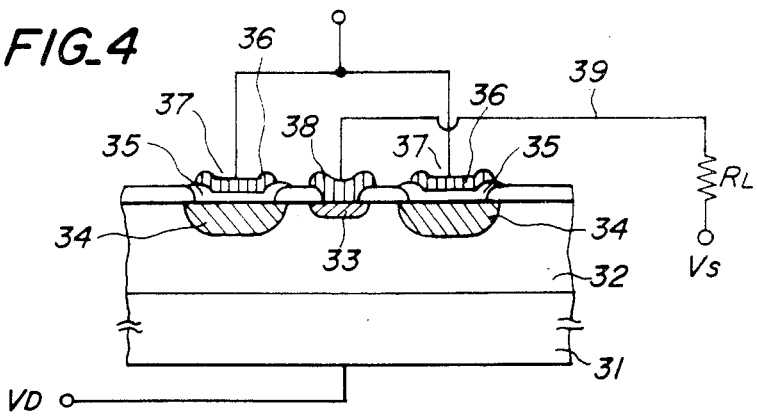
FIG. 4 is a cross section depicting a pixel construction of a solid state image sensing device in which the non-destructive readout can be effected.

FIG. 4 is a cross sectional view showing a unit pixel of such a solid state image sensing device. A reference numeral 31 denotes an n+ substrate serving as a drain of the SIT. On the substrate 31 is formed an n− epitaxial layer 32 in which an n+ source diffusion region 33 and a pair of p+ gate regions 34 and 34 are formed. On the epitaxial layer 32 is further formed an insulating film 35 and gate electrodes 36 and 36 are formed on the insulating film above the gate regions 34 and 34 to form capacitance 37. The gate electrodes 36 and 36 are connected to a gate line and the source region 33 is connected to a readout line 39 via a source electrode 38.

Figure 5:
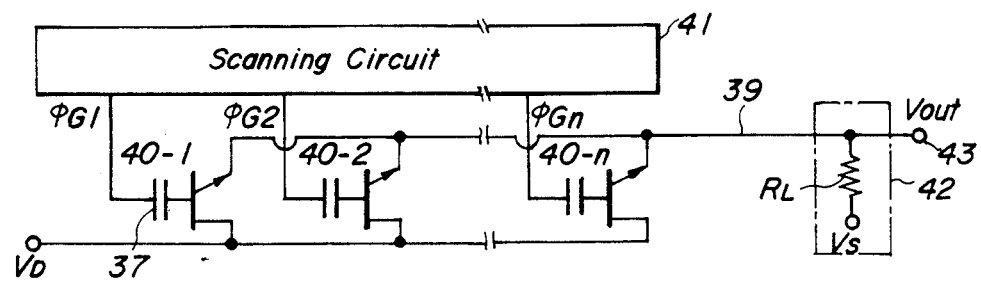
FIG. 5 is a circuit diagram of such a solid state image sensing device.

FIG. 5 is a circuit diagram illustrating a linear solid state imaging sensing device comprising a plurality of pixels shown in FIG. 4.

The device comprises a linear array of SITs 40-1, 40-2 ... 40-n, a scanning circuit 41 for successively switching the SITs via the capacitance 37, a readout line 39 commonly connected to the source electrodes 38 of the SITs, and a signal detecting circuit 42 connected to the readout line 39.

Figure 6A:
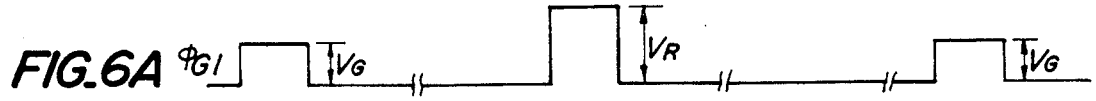
FIGS. 6A to 6E are waveforms for explaining the operation of the device shown in FIG. 5.
Figure 6B:
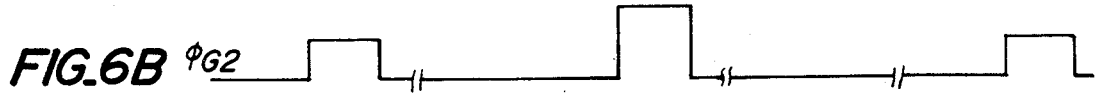
Figure 6C:
Figure 6D:
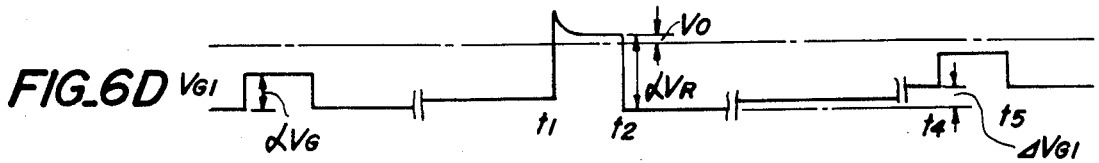
Figure 6E:
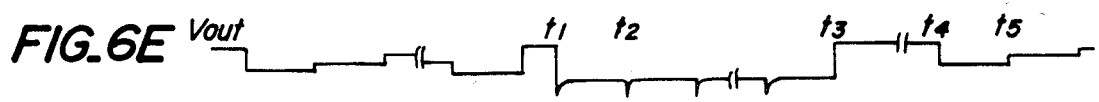

As shown in FIGS. 6A to 6C, each of gate line pulse signals $\phi_{G1}$, $\phi_{G2}$ ... $\phi_{Gn}$ applied to the capacitances 37 of pixels 40-1, 40-2 ... 40-n, respectively, comprises a readout pulse having an amplitude $V_G$ and a reset pulse having an amplitude $V_R$ which is higher than $V_G$. As illustrated in FIG. 6D, after the readout pulses $V_G$ are applied to the pixels 40-1, 40-2 ... 40-n, at a time instant $t_1$ the reset pulse $V_R$ is applied simultaneously to the gate lines of all the pixels. Then, for the first pixel 40-1, the light input integration period lasts from $t_2$ to $t_4$ and during this period a gate potential $V_{G1}$ is increased by $\Delta V_{G1}$ due to the injection of holes into the gate diffusion region 34. In the similar manner, the gate potentials of the SIT 40-2, 40-3 ... are increased successively.

Now the variation of the gate potential of the SIT 40-1 due to the application of the pulse $\phi_{G1}$ thereto and the reset and readout operations will be explained. In FIG. 5, the voltage $V_D$ applied to the drain of SIT is zero volt, i.e. the ground potential, and the source voltage $V_S$ applied to the source of the SIT via the readout line 39 and load resistor $R_L$ is a suitable positive voltage. This mode of operation is sometimes referred as the common drain readout system.

At the instant $t_1$, when the reset pulse having the highest voltage $V_R$ among the gate line pulse signal $\phi_{G1}$ is applied to the gate of the SIT 40-1, its gate potential $V_{G1}$ is increased by $\alpha V_R$, where $\alpha$ is a coefficient determined by $\alpha = C_1/C_1 + C_2 < 1$, $C_1$ being the value of the capacitance 37 and $C_2$ being a stray capacitance of the gate with respect to the substrate (drain) or source. If the increased gate potential is higher than the built-in voltage $\phi_B$ of the pn junction between the gate and drain, a reset current spike flows from the gate to drain and the gate potential is also changed in a spike manner as illustrated in FIG. 6D. Then the gate potential $V_{G1}$ is decreased to a value $V_O$ at which the forward current does not flow through the pn jucntion any more.

At the time instant $t_2$, the reset pulse is decreased by the amount $V_R$, the gate potential which is floating due to the capacitive coupling is decreased substantially by $\alpha V_R$ and becomes equal to $V_O - \alpha V_R$. Strictly speaking since the gate potential has a dependency upon the gate floating capacitance $C_2$, the gate potential is not precisely equal to $V_O - \alpha V_R$. Thereafter, during the time interval $t_2$ to $t_4$, the holes generated by the light input are stored in the gate region and the gate potential is increased by $\Delta V_{G1}$ and becomes equal to $V_O - \alpha V_R + \Delta V_{G1}$.

At the time instant $t_4$, when the gate line pulse signal $\phi_{G1}$ becomes the readout voltage $V_G$, the gate potential is again increased by $\Delta V_G$ due to the capacitive coupling and becomes equal to $V_O - \alpha V_R + \Delta V_{G1} + \alpha V_G$.

Now it is assumed that the SIT has such I-V characteristics that the current begins to flow when the gate potential becomes equal to $V_O - \alpha V_R + \alpha V_G$, i.e., the threshold voltage $V_T$ is equal to $V_O - \alpha(V_R - V_G)$, and thus when the gate potential becomes equal to $V_O - \alpha(V_R + V_G) + \Delta V_{G1} = V_T + \Delta V_{G1}$ such as the potential at the instant $t_4$, the drain current $I_d$ due to the increment $\Delta V_{G1}$ of the gate potential in accordance with the light input flows from the source supply source $V_S$ via the load resistor $R_L$ and readout line 39 into the drain (ground), so that the output voltage change $\Delta V_{out} = I_d \cdot R_L$ can be detected at an output terminal 43. For the remaining SITs 40-2, ... 40-n, a similar operation is carried out and in this manner the whole input image can be detected.

As explained above, the signal readout is effected in a non-destructive manner and the gate potential is maintained at the time of readout. After the signal readout, the gate is reset by applying the reset voltage for forwardly biasing the pn junction between the gate and drain of SIT.

Now embodiments of the solid state image sensing device with the photometry function according to the invention will be explained.

FIG. 7 is a circuit diagram showing a first embodiment of the linear solid state image sensing device according to the invention. The device comprises pixels 50-1, 50-2 ... 50-n arranged linearly, each comprising an SIT serving as the photodetecting and switching element, and a capacitance 52 for storing signal charge and applying a pulse to a floating gate of the SIT. An image signal reading out circuit 53 supplies readout pulses successively to the gates of the SITs to readout the pixels in a non-destructive manner. Sources of SITs are commonly connected to a signal readout line 54 which is connected to a signal detecting circuit 55 for converting the signal current into the output voltage $V_{out}$. Drains of SITs are commonly connected to a drain line 56. To gates of the odd numbered SITs 50-1, 50-3 ... are connected outputs of non-destructive readout circuit 57 for reading out selectively the odd numbered SITs in a non-destructive manner. The signal readout line 54 is further connected to a circuit 58 for integrating or averaging the readout signals. The circuit 58 is further connected to a comparison circuit 59 for comparing the integrated or averaged value with a predetermined value. An output of the comparison circuit 59 is supplied to a control circuit 60 for controlling the initiation of the readout circuit 53 for effecting the destructive readout for all the pixels.

Next, the operation of the device will be explained. In the present invention, both the common drain system in which the drain voltage $V_D$ on the drain line 56 in the ground potential and the source voltage $V_S$ on the readout line 54 are positive voltage, and the source follower system in which the drain voltage $V_D$ is positive and the source voltage $V_S$ is the ground potential are utilized. In the present embodiment, the common drain system is adopted.

FIGS. 8A to 8D show the readout pulses $\phi_{G1}$, $\phi_{G2}$, $\phi_{Gn-1}$ and $\phi_{Gn}$ applied from the readout circuit 53 to the gates of SITs 50-1, 50-2, 50-n-1 and 50-n, respectively, and photometry pulse signals $\phi_{M1}$ and $\phi_{Ml}$ applied to the gates of SITs 50-1 and 50-n-1, respectively. FIGS. 8E to 8F illustrate gate potentials of SITs 50-1, 50-2 and 50-n, and FIGS. 8G shows the output voltage $V_{out}$ appearing on the readout line 54.

At a time instant $t_1$, the pulse signal $\phi_{G1}$ is applied from the circuit 53 to the first pixel 50-1 to readout the signal therefrom. At time instants $t_2$, $t_3$ and $t_4$, the second, n-1th and nth pixels 50-2, 50-n-1 and 50-n are readout successively in a non-destructive manner. During these non-destructive readout periods, all the readout pulse signals having the value $V_G$. Immediately after the non-destructive readout, the potential $V_{GD}$ at the floating gate (at a point A in FIG. 7) varies as shown in FIG. 8E. At first, the potential $V_{G1}$ assumes a value near the built-in voltage $\phi_B$ of the pn junction between the gate and source, then is decreased in accordance with the forward voltage-current characteristic of the pn junction and lastly becomes a voltage value $V_O$ (nearly equal to 0.2 V) corresponding to a situation in which no forward current flows across the pn junction.

At the time instant $t_2$, when the signal $\phi_{G1}$ becomes a lower level, the potential at the point A is decreased by $\alpha V_{GD}$ and becomes equal to $V_O - \alpha V_{GD}$, where $\alpha$ is the coefficient determined by the value of the gate capacitance 52 and the stray capacitance of the gate with respect to the substrate or source. After that the potential $V_{G1}$ is gradually increased by the storage of holes in the gate diffusion region due to the light input. At the time instant $t_5$, the potential is increased by $\Delta V_{G1}(T_1)$.

At a next time instant $t_5$ for the first pixel 50-1, the pulse signal $\phi_{M1}$ having the high level $V_{GN}(V_{GN} < V_{GD})$ is applied to the gate from the circuit 57. Then the gate potential $V_{G1}$ is further increased by $\alpha V_{GN}$ and becomes equal to $V_O - \alpha V_{GD} + \Delta V_{G1}(T_1) + \alpha V_{GN}$. In this manner, the signal corresponding to charges stored in the first pixel 50-1 during the integration period $T_1$ is readout in a non-destructive manner. Since the threshold voltage $V_T$ of the SIT 51 is set to $V_O - \alpha(V_{GD} - V_{GN})$, if there is no light input during the period $T_1$, the output current at the time instant $t_5$ is zero. Contrary to this, when the gate potential has been increased by $\Delta V_{G1}(T_1)$ due to the light input, the current $I_{ds}[\Delta V_{G1}(T_1)]$ due to the gate potential increment flows through the load resistor $R_L$ to produce an output voltage $V_{out}$ corresponding to $I_{ds}[\Delta V_{G1}(T_1)]$ as shown in FIG. 8H.

At a time instant $t_7$ at which the first pixel 50-1 is readout at a second time, a similar non-destructive readout is carried out to obtain the output voltage $V_{out}$ equal to $R_L \cdot I_{ds}[\Delta V_{G1}(T_1 + T_2)]$ due to the light input for an integration period $(T_1 + T_2)$.

As for the remaining pixels, a similar readout operation is effected. In the present embodiment, only the odd numbered pixels are repeatedly readout in a non-destructive manner. The image signals readout of these odd numbered pixels are processed in the integrating or averaging circuit 58 and the integrated or averaged value is always compared with the predetermined value in the comparison circuit 59. When the integrated or averaged value reaches the predetermined value, the control circuit 60 sends a control signal to the destructive readout circuit 53 to effect the readout for all the pixels in a destructive manner. It should be noted that the control signal may be also supplied to the non-destructive readout circuit 57 to inhibit its operation.

The signals readout of all a pixels in the destructive manner can be utilized as the picked-up signal, but the signals readout of odd numbered pixels in a non-destructive manner are exclusively used for the photometry. It should be noted that pixels used for the photometry may be some of the pixels at the central portion of the device to effect the central photometry or all the pixels to effect the average photometry. Such modifications may be easily realized by suitably arranging the connection between the pixels and the non-destructive readout circuit 57.

In case of using a peak detection circuit 61, when the circuit 61 detects a fact that a peak value of one of the signals readout of odd numbered pixels arrives at a predetermined value, it sends a detection signal to the control circuit 60 to stop the photometry readout circuit 57 and to initiate the operation of the destructive readout circuit 53.

FIG. 9 is a circuit diagram showing a second embodiment of the two dimensional solid state image sensing device according to the invention, and FIGS. 10A to 10J are waveforms for explaining the operation thereof. The device comprises a matrix array 71 in which pixels are arranged in n rows and m columns, a horizontal scanning circuit 72, a vertical scanning circuit 73, an array 74 of horizontal selection switches, a signal detecting circuit 75 having a load resistor $R_L$ and a video voltage supply source $V_S$, a photometry vertical scanning circuit 76, a photometry horizontal scanning circuit 77, a photometry signal detecting circuit 79, an integrating or averaging circuit 80 for the photometry signal, a comparison circuit 81 for comparing the output from the integrating or averaging circuit with a predetermined value, a control circuit 82 for controlling the vertical and horizontal scanning circuits 72, 73, 76 and 77 in accordance with the output from the comparison circuit 81, and a peak detecting circuit 83 for detecting a peak of the photometry signals.

In the present embodiment, the photometry scanning circuits 76 and 77 are connected with even numbered row and column lines and thus only pixels connected to these even numbered row and column lines are selectively used for the photometry. By suitably changing the connections between the photometry scanning circuits 76 and 77 and the pixel array 71, it is possible to effect the central photometry.

FIGS. 10A to 10C show pulse signals $\phi_{V1}$, $\phi_{V2}$ and $\phi_{Vn}$ supplied from the vertical scanning circuit 73 to first, second and nth vertical selection lines, respectively. FIGS. 10D to 10F illustrate pulse signals $\phi_{H1}$, $\phi_{H2}$ and $\phi_{Hm}$ supplied from the horizontal scanning circuit 72 to first, second and mth horizontal selection switches of the array 74, respectively. In FIGS. 10B and 10C, there are also shown pulse signals $\phi_{M1}$ and $\phi_{Ml}$ applied to first and lth even numbered vertical selection lines, respectively from the photometry vertical scanning circuit 76. In FIGS. 10E and 10E, there are also illustrated pulse signals $\phi_{N1}$ and $\phi_{Nk}$ applied to switches of the photometry horizontal selection switch array 78 connected to first and kth even numbered horizontal selection lines, respectively, from the photometry horizontal scanning circuit 77. FIGS. 10G and 10H show potential variations $V_{G(2, 2)}$ and $V_{G(n, 2)}$ at the floating gates of the pixels at the second row and second column and at the nth row and second column. FIG. 10I illustrates an output voltage $V_{out1}$ of the signal detecting circuit 75 and FIG. 10J illustrates an output voltage $V_{out2}$ of the photometry signal detecting circuit 79. In FIGS. 10I and 10J, $S_{(n, m)}$ denotes an output voltage due to a signal readout of a pixel at the nth row and the mth column.

At a time instant $t_1$, the signal pulse $\phi_{V2}$ having an amplitude $V_G$ is applied to a second vertical selection line to initiate the signal readout for the pixels coupled with the second vertical selection line. At $t_1$ and $t_2$, the first and second pixels are successively readout and at $t_3$ the mth pixel is readout. At $t_4$, the pulse signal $\phi_{V2}$ is increased from $V_G$ to $V_R$ to effect simultaneously the refresh operation for all the pixels connected to the second vertical selection line. At $t_5$, the readout for the nth row is initiated and this readout is finished at $t_6$ at which all the pixels coupled with the nth row are simultaneously refreshed. Then the gate potentials of the pixels are changed as shown in FIGS. 10G and 10H. At the refresh timings $t_4$ and $t_6$, the gate potential changes abruptly in a spike-like manner, because the light charges stored in the floating gate are discharged toward the drain at the ground potential due to the application of high voltage $V_R$.

The signal readout for the photometry is carried out by selecting vertical and horizontal selection lines with the aid of the photometry vertical and horizontal scanning circuits 76 and 77. In the present embodiment, since only even numbered rows and columns are readout for the photometry, a pixel at the second row and second column is first readout to obtain a photometry output voltage $S_{(2, 2)}$ shown in FIG. 10J at the photometry signal detecting circuit 79. In a modified embodiment, the photometry horizontal selection switch array 78 and photometry signal detecting circuit 79 may be deleted. In such an embodiment, the photometry signal may be derived by means of the horizontal selection switch array 74 and signal detecting circuit 75.

In a similar manner, at time instants $t_8$, $t_9$ and $t_{10}$ pixels at the second row and kth column, at nth row and second column, and at nth row and kth columns are readout for the photometry, respectively. From an instant $t_{11}$, the second photometry readout is initiated. In this manner, predetermined pixels are repeatedly readout for the photometry.

Every time the photometry readout is effected, the readout photometry signals are integrated or averaged by the circuit 80 and the integrated or averaged value is compared with the predetermined value in the circuit 81. When the comparison circuit 81 detects the fact the integrated or averaged value reaches the predetermined value, the circuit 81 sends a detection signal to the control circuit 82. Then the control circuit sends control signals to the scanning circuits 76 and 77 to stop the photometry readout. At the same time the control circuit 82 sends commands to the scanning circuits 72 and 73 to initiate the readout for all the pixels in the array 71. During this readout, the pixels belonging to respective rows are simultaneously refreshed at time instants $t_4$, $t_6$ . . . .

In a modified embodiment, there is provided a peak detection circuit 83 in parallel with the integrating or averaging circuit 81 and during the picking-up, when a peak value of the output signals readout of the pixels selected for the photometry reaches a predetermined value, the circuit 83 sends a detection signal to the control circuit 82 to inhibit the photometry scanning circuits 76 and 77 and to initiate the scanning circuits 72 and 73.

As explained above in detail, according to the invention since there is provided the means for reading the photometry signals out of selected pixels in a non-destructive manner in addition to the means for effecting the ordinary image picking-up readout, it is possible to perform the photometry during the picking-up without providing separate photometry pixel or pixels. In this case, by suitably selecting previously pixels to be used for the photometry, it is possible to set at will the photometry region precisely. Moreover, in case of providing the peak detection circuit to detect the peak value of the readout signals during the photometry it is possible to select any desired one of the different tone images.

What is claimed is:

1. A solid state image sensing device comprising:
 a plurality of pixels each including a static induction transistor having a gate, a drain and a source, and a capacitance coupled with the gate of said static induction transistor;
 first readout means for reading image signals out of said pixels successively and resetting photocharge stored in the pixels due to light input;
 second readout means for reading photometry signals out of selected pixels in a non-destructive manner;
 means for processing said photometry signals to produce a detection signal indicating that desired photocharge has been stored in the pixels; and
 means for controlling said first and second readout means in accordance with said detection signal in such a manner that a photometry is effected while the light input is picked up.

2. A device according to claim 1, wherein said processing means is so constructed that the photometry signals are integrated and an integrated value is compared with a predetermined value and said detection signal is produced when the integrated value reaches the predetermined value.

3. A device according to claim 1, wherein said processing means is constructed such that the photometry signals are averaged, an averaged value is compared with a predetermined value and said detection signal is produced when the averaged value reaches the predetermined value.

4. A device according to claim 1, wherein said processing means is constructed such that a peak value of the photometry signals is detected, the peak value is compared with a predetermined value and said detection signal is produced when the peak value reaches the predetermined value.

5. A device according to claim 1, wherein said control means inhibits the operation of the second readout means and initiates said first readout means in response to said detection signal.

6. A device according to claim 1, wherein said pixels are arranged linearly, the sources and drains of all of said static induction transistors are commonly connected to a signal readout line connected to said processing means and a reference potential, respectively, said first readout means comprises a first scanning circuit having outputs connected to the gates of all said static induction transistors, and said second readout means comprises a second scanning circuit having outputs connected to gates of the static induction transistors constituting said selected pixels.

7. A device according to claim 1, wherein said pixels are arranged in a matrix form in such a manner that sources of said static induction transistors belonging to each column are connected to respective column lines which are commonly connected to a signal readout line via first column selection switches, gates of said static induction transistors belonging to respective rows are connected to respective row lines and drains of all of the static induction transistors are commonly connected to a reference potential, said first readout means comprises a first horizontal scanning circuit having outputs connected to said first column selection switches and a first vertical scanning circuit having outputs connected to respective row lines, and said second readout means comprises second column selection switches connected to column lines with which said selected pixels are coupled, a second horizontal scanning circuit having outputs connected to said second column selection switches and a second vertical scanning circuit having outputs connected to row lines with which said selected pixels are coupled.

* * * * *